Patented Jan. 25, 1944

2,340,110

UNITED STATES PATENT OFFICE 2,340,110

PROCESS FOR REMOVING CATIONS FROM LIQUID MEDIA

Gaetano F. D'Alelio, Pittsfield, Mass., assignor to General Electric Company, a corporation of New York No Drawing. Application July 3, 1942, Serial No. 449,679

9 Claims. (Cl. 210—24)

The present invention relates to a process for treating liquid media. More particularly, this invention relates to a novel method of removing cations from liquid media such as aqueous media, by contacting the liquid media with a mass comprising an infusible, insoluble copolymer containing carboxyl groups.

Many natural and synthetic compositions have been proposed for removing cations from solutions. Such materials to be useful must possess the following properties:

1. They must contain either a chemical group which will react with the cation or have an activated surface which physically adsorbs the cation.
2. They must be capable of regeneration to at least part of their original activity so that they may be reused.
3. They must be insoluble in the liquid media before and after removing cations from the media. Thus, if an acid were used as the treating agent it would have to be insoluble both as the acid and as the salt since the acid is the form before adsorbing cations and the salt is the form after adsorbing cations.

Soluble and fusible polymers and copolymers containing free carboxyl groups are known. For example, the copolymer of styrene and maleic anhydride may be prepared. Salts of this copolymer have been described as water-soluble and suitable for treating cloth. Such a copolymer would, therefore, be unsuitable for removing cations, such as sodium ions, from water since in so doing the resins themselves would dissolve.

I have now discovered that cations may be removed from liquid media by contacting such media with a mass comprising an infusible, insoluble copolymer of a polymerizable mixture comprising (1) at least one polymerizable compound containing a polymerizable

grouping and at least one other polymerizable grouping, the unsaturated bonds of said polymerizable groupings being non-conjugated with respect to each other, (2) styrene and (3) maleic anhydride, there being at least one mol of styrene for each mol of maleic anhydride present in the polymerizable mixture.

Any suitable method may be used in preparing the insoluble, infusible copolymers for use in my invention. For example, the components may be mixed and polymerized in the presence or absence of a solvent or a dispersion medium for the components by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts which may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials.

After polymerization is complete, the product is isolated, if a solvent or dispersion medium was used, and ground to a granular form. All factors being equal, the finer the granular form or the more surface that is exposed, the more effective the copolymer is in removing cations from solution.

When liquid media having various cation impurities dissolved therein are brought in contact with these insoluble, infusible copolymers containing carboxyl groups, the cations, e. g., sodium ions, calcium ions, lead ions, magnesium ions, iron ions, etc. react with the carboxyl groups to form salts which are also insoluble and infusible. The cations are, therefore, effectively removed from solution.

After the resin has adsorbed the cations it can readily be regenerated, for example by washing with a dilute acid, preferably a mineral acid which forms soluble salts with the adsorbed cations.

Illustrative examples of suitable compounds containing at least one polymerizable $$CH_2=C\diagdown$$

grouping and at least one other polymerizable grouping, the unsaturated bonds of said polymerizable groupings being non-conjugated with respect to each other, are:

Allyl acrylate
Methallyl acrylate
Allyl methacrylate
Crotyl acrylate
Crotyl methacrylate
Allyl ethacrylate
Allyl cinnamate
Proparzyl acrylate
Methallyl methacrylate
Ethallyl acrylate
Ethallyl methacrylate
Allyl alpha-phenylacrylate
Allyl alpha-chloroacrylate
Diallyl phthalate
Dimethallyl phthalate
Dipropargyl phthalate
Diallyl maleate
Diallyl succinate
Diallyl oxalate
Diallyl itaconate
Dimethallyl itaconate
Diethallyl itaconate
Diallyl malonate
Diallyl allylmalonate
Diallyl citrate
Triallyl citrate
Diallyl fumarate
Diallyl acetone
Divinyl ether
Diallyl ether
Dimethallyl ether
Glycol diacrylate (ethylene diacrylate)
Glycol dimethacrylate
Glyceryl diacrylate
Glyceryl triacrylate
Glyceryl dimethacrylate
Glycol diethacrylate
Divinyl benzene In order that those skilled in the art better may understand how the present invention is carried into effect the following illustrative examples are given, all parts being by weight.

*Example 1*

|   |   | Parts |
|---|---|---|
| A. | Maleic anhydride | 49 |
|    | Styrene | 52 |
|    | Ethylene dimethacrylate | 10 |
| B. | Maleic anhydride | 45 |
|    | Styrene | 55 |
|    | Ethylene dimethacrylate | 10 |
| C. | Maleic anhydride | 35 |
|    | Styrene | 65 |
|    | Diallyl itaconate | 12 |
| D. | Maleic anhydride | 35 |
|    | Styrene | 65 |
|    | Diallyl itaconate | 20 |

In each of the separate monomeric mixtures, 1% benzoyl peroxide was dissolved as a polymerization accelerator. The mixture of Example 1A was polymerized by heating the mixture in a vessel equipped with a reflux condenser until an exothermic reaction commenced. Heating was discontinued and the polymerization proceeded very rapidly. The remaining mixtures were placed in sealed containers and heated to 40° C. for a time long enough to dissolve the maleic anhydride. The samples were then allowed to stand at room temperature for 48 hours by which time they were all polymerized to the solid state. To insure complete polymerization they were heated at 40° C. for 18 hours and at 90° C. for 24 hours.

The anhydride groups were hydrolyzed to carboxyl groups by heating the ground resins for 2 hours on a steam bath with an alkaline solution. Alkaline conditions were maintained throughout the heating period. The resins were filtered from the solution, treated with a dilute hydrochloric acid solution, washed and dried.

The treated resins were tested for their ability to remove cations from solution by allowing a weighed sample of each resin to remain in contact with a standard sodium hydroxide solution for five minutes, filtering and titrating the filtrate with standard acid to determine how much the alkalinity of the water had been decreased by the adsorption of the sodium ions. The efficiency was measured by calculating the ratio of sodium ions actually removed to the sodium ions theoretically removable if each of the carboxyl groups present in the copolymer had removed a sodium ion.

The results of these measurements are given in the following example:

*Example 2*

| Copolymer of Example 1: | Efficiency, per cent |
|---|---|
| A | 41 |
| B | 15 |
| C | 21 |
| D | 15 |

That the resins were capable of being regenerated is shown by the fact that in the hydrolysis of the anhydride groups the formed carboxyl groups reacted with the alkali of the solution and the resin was then regenerated with the hydrochloric acid. The results of Example 2, therefore, are actually the results of the regenerated resins.

Although in the above examples I have used copolymers prepared from mixtures containing from about 10 to 20% of a polymerizable compound containing a plurality of polymerizable groups, it will be understood by those skilled in the art that other proportions may be used and more than three compounds may be used in preparing the copolymer. However, since the carboxyl groups are the active part of the resin in removing cations from solution and the compounds containing more than one polymerizable group cause the copolymer to be insoluble and infusible, I prefer that the polymerizable mixture contain a maximum amount of maleic anhydride and a minimum amount of the other components commensurate with the desired insolubility. In general, the proportions illustrated by the examples are preferred.

Also, I may include an inert material such as diatomaceous earth (e. g., fuller's earth, including spent fuller's earth from petroleum refining processes), alundum, coke, silica, cinders, porous glass, etc., as a carrier for the copolymer to increase the effective surface of the latter. This may be done by adding such carriers at any time prior to the complete polymerization of the copolymer to the infusible, insoluble state followed by complete polymerization. In this way the carrier is surface coated with the copolymer. An emulsion or dispersion type of polymerization is admirably suited for coating the carrier materials since it can be carried out by adjusting the concentration and type of dispersing or emulsifying agent so as to eliminate the necessity of grinding the copolymer before use since the product will be obtained in a finely divided state.

What I claim as new and desire to secure by Letters Patent of the United States is:

1. The method of treating liquid media to remove cations therefrom which comprises contacting such media with a mass comprising a substantial amount of an insoluble, infusible copolymer of a polymerizable mixture comprising (1) at least one compound having a polymerizable

grouping and at least one other polymerizable grouping, the unsaturated bonds of said polymerizable groupings being non-conjugated with respect to each other, (2) styrene and (3) maleic anhydride, there being at least one mol of styrene for each mol of maleic anhydride present in the polymerizable mixture.

2. The method of treating liquid media to remove cations therefrom which comprises contacting such media with a mass comprising a substantial amount of an insoluble, infusible copolymer of a polymerizable mixture comprising (1) at least one compound having a plurality of

groupings, the unsaturated bonds of said polymerizable groupings being non-conjugated with respect to each other, (2) styrene and (3) maleic anhydride, there being at least one mol of styrene for each mol of maleic anhydride present in the polymerizable mixture.

3. The method as in claim 1 wherein the compound having a

grouping and at least one other polymerizable grouping comprises from ten to twenty per cent by weight of the polymerizable mixture.

4. The method as in claim 2 wherein the compound containing a plurality of

groupings comprises from ten to twenty per cent by weight of the polymerizable mixture.

5. The method which comprises depositing on an inert carrier a surface coating of a mass comprising a substantial amount of an insoluble, infusible copolymer resulting from the polymerization of a polymerizable mixture comprising (1) at least one compound containing a polymerizable

grouping and at least one other polymerizable grouping, the unsaturated bonds of said polymerizable groupings being non-conjugated with respect to each other, (2) styrene and (3) maleic anhydride, there being at least one mol of styrene for each mol of maleic anhydride present in the polymerizable mixture, and contacting a liquid medium containing cations with the treated carrier to remove cations from the liquid medium.

6. The method of treating aqueous media to remove cations therefrom which comprises percolating such media through a mass comprising a substantial amount of an insoluble, infusible copolymer of a polymerizable mixture comprising (1) at least one compound having a

grouping and at least one other polymerizable grouping, the unsaturated bonds of said polymerizable groupings being non-conjugated with respect to each other, (2) styrene and (3) maleic anhydride, there being at least one mol of styrene for each mol of maleic anhydride present in the polymerizable mixture.

7. The method as in claim 6 wherein the compound containing the polymerizable groupings including a

grouping is dimethallyl ether.

8. The method as in claim 6 wherein the compound containing the polymerizable groupings including a

grouping is diallyl itaconate.

9. The method as in claim 6 wherein the compound containing the polymerizable groupings including a

grouping is ethylene dimethacrylate.

GAETANO F. D'ALELIO.